UNITED STATES PATENT OFFICE.

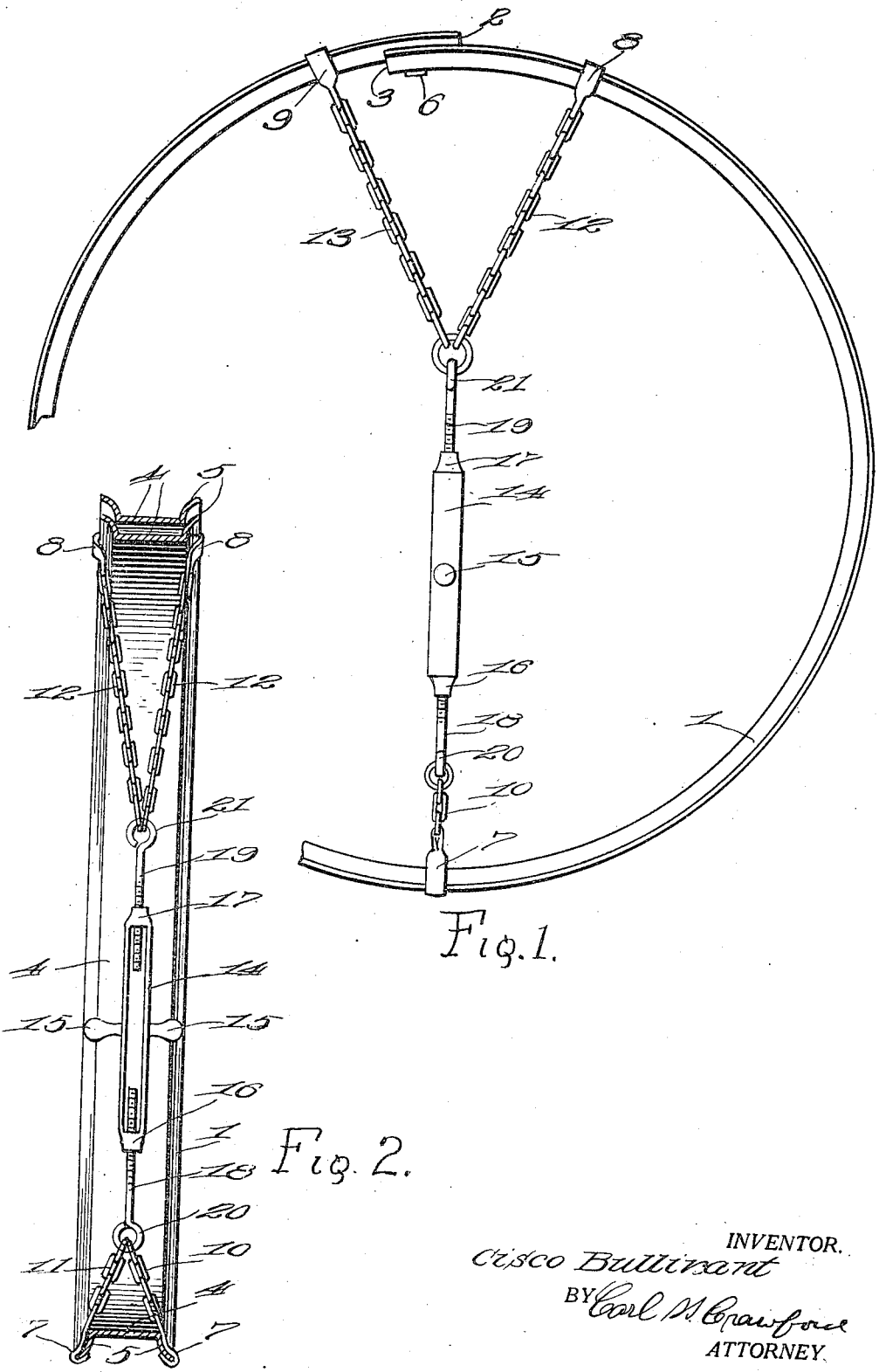

CISCO BULLIVANT, OF SPOKANE, WASHINGTON, ASSIGNOR OF ONE-HALF TO WALTER W. ZENT, OF SPOKANE, WASHINGTON.

TIRE-RIM-REDUCING DEVICE.

1,268,542.

Specification of Letters Patent.   Patented June 4, 1918.

Application filed September 19, 1916.   Serial No. 121,022.

*To all whom it may concern:*

Be it known that I, CISCO BULLIVANT, a citizen of the United States, residing at Spokane, in the county of Spokane and State of Washington, have invented new and useful Improvements in Tire-Rim-Reducing Devices, of which the following is a specification.

This invention relates to improvements in devices for facilitating a release or attachment of a tire to the modern type of split rims.

These rims are generally split transversely of their plane and their terminals are locked in end to end abutting relation, when the rim is on the wheel. The rim is provided with continuously annular bead retaining flanges for holding the shoe in position and heretofore the removal or application of a shoe, and its tire, from or upon the rim has involved a tedious prying application with various kinds of tools. Notwithstanding the fact that the rim is split, its resiliency is such that in the absence of some means of a special character, it is impossible to reduce the diameter sufficiently to remove the shoe, and its tire, off from the rim. These prying operations very often not only injure the beads of the shoe but they also injure the protecting flap of the inner tube and sometimes the tube itself.

Now it is the primary object of my invention to reduce the diameter of the rim, from the normal diameter, to such an extent that the inner tube and the protecting shoe can be readily extended over or taken off from the rim laterally, in order to make the desired repairs.

In the most improved embodiment of my invention, the same operates to radially separate the split terminals and thereafter telescope the same circumferentially of the rim so as to reduce the diameter of the rim from normal.

My invention has other features of novelty which will be more fully described in connection with the accompanying drawing and which will be more particularly pointed out in and by the appended claims.

In the drawing:—

Figure 1 is a view in side elevation of a split rim showing the manner of application of my device thereto in reducing the diameter of the rim.

Fig. 2 is a vertical sectional view of the rim illustrating the device of my invention in elevation.

Like characters of reference designate similar parts throughout the different figures of the drawing.

In the form shown, 1 designates a tire rim which is transversely split to provide abutting terminals 2 and 3. In cross-section, the rim comprises a cylindrical web 4 having oppositely and radially outwardly projecting flared flanges 5 between which the shoe of the tire is retained, or rather the beads thereof. These bead retaining flanges are continuously annular and unbroken as will be seen by reference to Fig. 1. On terminal 3, there is provided any form of locking means, broadly indicated at 6, to lock the abutting terminals 2 and 3 in endwise abutting relation, when the tire is in position, to provide for application of the rim to the vehicle wheel. As this lock is not a feature of my invention the same will not be described in detail.

It may be stated at this point that while the rim is not resilient or is not tempered with a view of contraction or expansion, the rim is constructed to yield to contraction under some considerable stress. In other words, when the rim is off from the wheel, the rim resists either expansion or contraction from its normal diameter.

The main feature of my invention is to contract the diameter of the rim so that the retaining flanges thereof will be of less diameter than the internal diameter of the shoe to thereby permit removal or application of the shoe to the tire without the application of prying tools.

As illustrated, I provide a single set or pair of grips 7 which are shaped to embrace opposite retaining flanges 5 and frictionally hold themselves in position under stress. Terminal grips, preferably in pairs, are indicated at 8 and 9, and are similar to the single set of grips 7 and are adapted to be applied to the terminal portions 3 and 2, as shown in Fig. 1. Tension lines such as chains 10 and 11 are connected with grips 7, and to each of grips 8 there is connected a pair of tension lines 12. To each of grips 9 there is connected a pair of tension lines 13.

A contraction device is provided for applying tension to said lines to perform the function desired and as illustrated, this contracting device is in the form of a turn buckle, 14 indicating the nut portion of the turn buckle and the same having a hand-grip 15 to facilitate operation of the same. The threaded portions of the turn buckle are indicated at 16 and 17 and into each threaded portion is turned a threaded stem, as indicated at 18 and 19. The stems 18 and 19 have eyes 20 and 21, respectively for connection thereto of the tension lines. Tension lines 10 and 11 are connected to eye 20 and tension lines 12 and 13 are connected to eye 21. Now as the turn buckle or the nut portion 14 thereof is turned in one direction, the stems 18 and 19 will be contracted to apply tension to the tension lines for the purpose of contracting the rim.

Now it will be clear that unless the terminal ends 2 and 3 were separated, it would be difficult to contract the rim. Of course it would be possible to pry the terminals apart from each other and into telescoping relation and then apply stress, but in practice, it is found that this method is not so successful as with the improved feature which I am about to describe, although I do not wish to be limited, in all embodiments of my invention to this new feature.

In order to separate and then contract, I provide the pair of lines 12 of slightly decreased length with respect to the lines 13 and then when tension is applied, the shorter lines 12 serve to radially contract the terminal 3 toward the center before the terminal 2 is contracted. After the terminals 2 and 3 are radially separated from each other then they assume the telescoping relation, circumferentially, as shown in Fig. 1, whereupon further contraction can be made to reduce the diameter of the rim from normal. Furthermore, by reason of the difference in length of the pair of lines 12 with respect to the pair of lines 13, the terminals in telescoping relation are also held in spaced relation, as clearly shown in Fig. 2, and this greatly facilitates further contraction. I have found in practice that it is not important where the grips 8 and 9 are applied, in view of the difference in length of the lines 12 and 13, by reason of the fact that the lines 12 are very considerably shortened with respect to the lines 13 and therefore no nicety of adjustment is required.

It will also be seen that with my improved arrangement, as shown in Fig. 2, the entire contracting mechanism is substantially wholly within and between the planes of the oppositely projecting retaining flanges and therefore the telescoping portions are retained in concentric relation which would not be the case if stress was applied to the retaining flanges wholly upon one side of the rim.

It will be seen that the lines 12 and 13 constitute differentially acting means operated upon actuation of the contracting mechanism for first radially separating the abutting terminals and then circumferentially telescoping the same for the purpose of reducing the diameter of the rim, and holding it in a reduced position.

It is believed that the advantages and utility of my invention will be fully understood from the foregoing description, and while I have herein shown one specific form of my invention, I do not wish to be limited thereto except for such limitations as the claims may import.

I claim:—

1. As a means for releasing or facilitating application of a tire to a split rim, a single set of grips for engagement with opposite marginal edges of said rim substantially diametrically of opposite the split portion thereof, terminal sets of grips for engagement with opposite margins of each split terminal of said rim, a contracting means, tension lines connecting said contracting means with said single set of grips, one set of said terminal sets being connected with said means by lines of relatively short lengths and the other set of said terminal grips being connected with said means by lines of a greater length than the lines connecting the remaining set of said terminal grips whereby actuation of said means will differentially operate on the split terminals to first radially separate and then circumferentially telescope the same, substantially as described.

2. As a means for releasing or facilitating application of a tire to a split rim, a turn buckle device having endwise disposed eyes, a single set of grips for engagement with opposite marginal edges of the rim diametrically opposite the split portion thereof, tension lines of uniform length connecting said single set of grips with one of said eyes, a set of grips for engagement with opposite marginal edges of each terminal of the split portion of said rim, a pair of lines engaging one set of terminal grips with the remaining eye of said turn buckle device and a pair of lines engaging the remaining terminal grips with the eye of said device, the lines of said terminal grips being of unequal length whereby tension actuation by said device will serve to radially separate and then circumferentially telescope the terminals of said rim; substantially as described.

In testimony, that I claim the foregoing as my own, I hereby affix my signature.

CISCO BULLIVANT.

Copies of this patent may be obtained for five cents each, by addressing the "Commissioner of Patents, Washington, D. C."